US010812406B2

(12) United States Patent
Santosuosso et al.

(10) Patent No.: US 10,812,406 B2
(45) Date of Patent: Oct. 20, 2020

(54) ASSIGNING PROCESSING ELEMENTS TO STREAM COMPUTING SERVERS

(71) Applicant: International Business Machines Corporation, Armonk, NY (US)

(72) Inventors: John M. Santosuosso, Rochester, MN (US); Daniel E. Beuch, Rochester, MN (US); Michael J. Branson, Rochester, MN (US); Eric L. Barsness, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 15/807,074

(22) Filed: Nov. 8, 2017

(65) Prior Publication Data
US 2019/0140969 A1    May 9, 2019

(51) Int. Cl.
*H04L 12/911* (2013.01)
*H04L 29/08* (2006.01)
(Continued)

(52) U.S. Cl.
CPC ............ *H04L 47/70* (2013.01); *G06F 9/5027* (2013.01); *H04L 65/605* (2013.01); *H04L 65/80* (2013.01); *H04L 67/10* (2013.01); *H04L 43/0852* (2013.01)

(58) Field of Classification Search
CPC ............... H04L 65/1066; H04L 65/607; H04L 47/2416; H04L 65/00
(Continued)

(56) References Cited

U.S. PATENT DOCUMENTS 7,222,182 B2   5/2007  Lisitsa et al.
8,312,426 B2   11/2012 Bouillet et al.
(Continued)

OTHER PUBLICATIONS

Amini et al., "Adaptive Control of Extreme-scale Stream Processing Systems," Computer Society, Proceedings of the 26th IEEE International Conference on Distributed Computing Systems (ICDCS'06), 2006, 7 pages.
(Continued)

*Primary Examiner* — Mahran Y Abu Roumi
(74) *Attorney, Agent, or Firm* — Alex Harvey

(57) ABSTRACT

The present invention provides a computer implemented method, system, and computer program product of assigning processing elements to stream computing servers with respect to external computing resources. In an embodiment, the present invention includes receiving performance requirements data of a plurality of processing elements of a computer software application, where the processing elements are configured to execute on a stream computing system, receiving resource characteristics data of at least one computing resource external to the stream computing system, receiving performance characteristics data of stream computing servers, and in response to receiving a request from at least one processing element to communicate with the at least one computing resource external to the stream computing system, assigning the at least one processing element to at least one stream computing server as a function of the performance requirements data, the resource characteristics data, and the performance characteristics data.

18 Claims, 12 Drawing Sheets

(51) Int. Cl.
*G06F 9/50* (2006.01)
*H04L 29/06* (2006.01)
*H04L 12/26* (2006.01)

(58) Field of Classification Search
USPC .......................................................... 709/231
See application file for complete search history.

(56) References Cited

U.S. PATENT DOCUMENTS

| | | | | |
|---|---|---|---|---|
| 2004/0221040 | A1* | 11/2004 | Lisitsa | G06F 9/546 709/226 |
| 2009/0177957 | A1* | 7/2009 | Bouillet | H04L 67/02 715/230 |
| 2013/0152047 | A1* | 6/2013 | Moorthi | G06F 11/368 717/124 |
| 2014/0108671 | A1* | 4/2014 | Watson | H04L 67/322 709/231 |
| 2014/0282605 | A1* | 9/2014 | Jacobson | G06F 9/5066 718/107 |
| 2015/0120953 | A1* | 4/2015 | Crowe | H04L 65/80 709/231 |
| 2019/0018610 | A1* | 1/2019 | Hegde | G06F 3/0679 |

OTHER PUBLICATIONS

Bonfils et al., "Adaptive and Decentralized Operator Placement for In-Network Query Processing," Information Processing in Sensor Networks, Springer Berlin Heidelberg, 2003, 16 pages.
Govindan et al., "Directed Diffusion: A Scalable and Robust Communication Paradigm for Sensor Networks," Proceedings of the 6th ACM/IEEE Mobicom Conference, 2000, 12 pages.
Pietzuch et al., "Network-Aware Operator Placement for Stream-Processing Systems," Proceedings of the 22nd International Conference on Data Engineering (ICDE'06), 2006, 12 pages.
Repantis et al., "Replica Placement for High Availability in Distributed Stream Processing Systems," Proceedings of the Second International Conference on Distributed Event-Based Systems, ACM, 2008, 12 pages.
Riabov et al., "Planning for Stream Processing Systems," American Association for Artificial Intelligence, 2005, 6 pages.
Wong et al., "Meridian: A Lightweight Network Location Service without Virtual Coordinates," ACM SIGCOMM Computer Communication Review, vol. 35, No. 4, ACM, 2005, 12 pages.
Mell et al., "The NIST Definition of Cloud Computing," Recommendations of the National Institute of Standards and Technology, US Department of Commerce, NIST Special Publication 800-145, Sep. 2011, 7 pages.

\* cited by examiner

ASSIGNING PROCESSING ELEMENTS TO STREAM COMPUTING SERVERS

BACKGROUND

The present disclosure relates to computer systems, and more specifically, to assigning processing elements to stream computing servers with respect to external computing resources.

SUMMARY

The present invention provides a computer implemented method, a system, and a computer program product of assigning processing elements to stream computing servers with respect to external computing resources. In an exemplary embodiment, the computer implemented method, the system, and the computer program product include (1) receiving, by a computer system, performance requirements data of a plurality of processing elements of a computer software application, where the processing elements are configured to execute on a stream computing system, where the stream computing system includes a network of stream computing servers, (2) receiving, by the computer system, resource characteristics data of at least one computing resource external to the stream computing system, (3) receiving, by the computer system, performance characteristics data of the stream computing servers, and (4) in response to receiving by the computer system a request from at least one processing element among the processing elements to communicate with the at least one computing resource external to the stream computing system, assigning, by the computer system, the at least one processing element to at least one stream computing server among the stream computing servers as a function of the performance requirements data, the resource characteristics data, and the performance characteristics data.

DETAILED DESCRIPTION

Figure 1A:
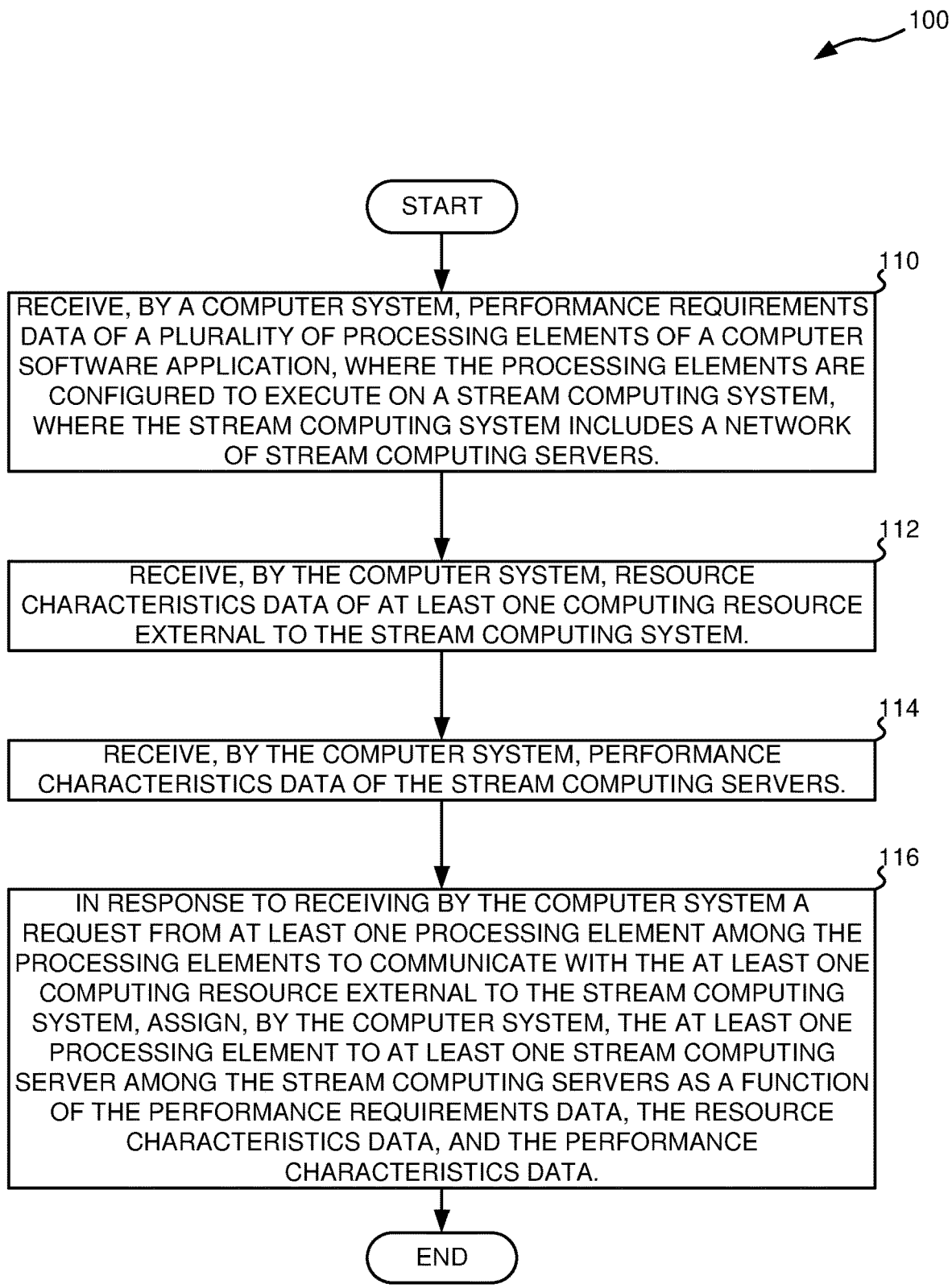
FIG. 1A depicts a flowchart in accordance with an exemplary embodiment of the present invention.

The present invention provides a computer implemented method, a system, and a computer program product of assigning processing elements to stream computing servers with respect to external computing resources. In an exemplary embodiment, the computer implemented method, the system, and the computer program product include (1) receiving, by a computer system, performance requirements data of a plurality of processing elements of a computer software application, where the processing elements are configured to execute on a stream computing system, where the stream computing system includes a network of stream computing servers, (2) receiving, by the computer system, resource characteristics data of at least one computing resource external to the stream computing system, (3) receiving, by the computer system, performance characteristics data of the stream computing servers, and (4) in response to receiving by the computer system a request from at least one processing element among the processing elements to communicate with the at least one computing resource external to the stream computing system, assigning, by the computer system, the at least one processing element to at least one stream computing server among the stream computing servers as a function of the performance requirements data, the resource characteristics data, and the performance characteristics data. In an embodiment, the computer system includes a stream computing manager system (e.g., a stream runtime system). In a particular embodiment, the computer system is a stream computing manager system (e.g., a stream runtime system). In an embodiment, the computer software application includes a stream computing application. In a particular embodiment, the computer software application is a stream computing application. In an embodiment, the network of stream computing servers includes the stream computing servers logically interconnected in a computer network configuration. In a particular embodiment, the network of stream computing servers is a cluster of the stream computing servers. In an embodiment, the at least one computing resource external to the stream computing system includes a computer data source/sink. In a particular embodiment, the at least one computing resource external to the stream computing system is a computer data source/sink. In a particular embodiment, the computer data source/sink is at least one of a computer database, a computer message queue, a computer storage device, a sensor, a camera, and a microphone. For example, the computer data source/sink could be any one of a computer database, a computer message queue, a computer storage device, a sensor, a camera, and a microphone.

Definitions

Stream Computing

Stream-based computing, stream-based database computing, and stream computing systems are developing technologies for database systems. Current stream-based computing systems, stream-based database computing systems, and stream computing systems allow users to create computer software applications that process and query streaming tuples of data before such data reaches a database file. Stream-based computing systems, stream-based database computing systems, and stream computing systems allow users to specify processing logic to apply to inbound data records while they are "in flight", with the results being available in a very short amount of time, often in fractions of a second.

A stream computing system analyzes multiple data streams from many sources live, where "stream" means the stream computing system pulls in streams of data, processes the data, and streams it back out as a single flow.

In a stream computing application, stream operators are connected to one another such that data flows from one stream operator to the next (e.g., over a TCP/IP socket). When a stream operator receives data, the stream operator may perform operations, such as analysis logic, which may change the tuple by adding or subtracting attributes, or updating the values of existing attributes within the tuple. When the analysis logic is complete, the stream operator sends a new tuple to the next stream operator.

Processing Elements

A stream computing system achieves scalability by distributing a computer software application/stream computing application across nodes by creating executables (i.e., processing elements), as well as replicating processing elements on multiple nodes and load balancing among them. Stream operators in a stream computing application can be fused together to form a processing element that is executable, such that the processing elements can share a common process space, that may result in faster communication between stream operators than is available using inter-process communication techniques (e.g., using a TCP/IP socket). Further, processing elements can be inserted or removed dynamically from an operator graph representing the flow of data through the stream computing application. Also, a particular stream operator may not reside within the same operating system process as other stream operators. In addition, stream operators in the same operator graph may be hosted on different nodes (e.g., on different compute nodes) or on different cores of a compute node. In stream computing, a stream computing application is broken into smaller units of work that are distributed out to a cluster of machines, where the smaller units of work may be called processing elements.

Tuples

Data flows from one stream operator to another in the form of a "tuple", where a tuple is a sequence of one or more attributes associated with an entity. Attributes may be any of a variety of different types (e.g., integer, float, Boolean, string), where the attributes may be ordered. A tuple may also include metadata (i.e., data about the tuple). Also, a tuple may be extended by adding one or more additional attributes or metadata to it. The terms "stream" or "data stream" refers to a sequence of tuples. Generally, a stream may be considered a pseudo-infinite sequence of tuples.

In a stream computing application, tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element, where an attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple. Generally, a particular tuple output by a stream operator or processing element may not be considered to be the same tuple as a corresponding input tuple even if the input tuple is not changed by the processing element. However, an output tuple that has the same data attributes or is associated with the same entity as a corresponding input tuple may be considered as the same tuple.

Processing Tuples

Stream computing applications may handle large volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it may be necessary to use an inter-process communication path each time a tuple is sent from one stream operator to another, where such inter-process communication paths can be a critical resource in a stream computing application. Efficient use of inter-process communication bandwidth could speed up processing.

An operator graph could be an execution path for a plurality of stream operators to process a stream of tuples. In addition to stream operators, the operator graph could refer to an execution path for processing elements and the dependent stream operators of the processing elements to process the stream of tuples. Generally, the operator graph could have a plurality of stream operators that produce a particular end result (e.g., calculate an average). An operator graph may be a linear arrangement of processing elements and/or operators, or it may include one or more distinct execution paths, also known as sub-processes, methods, or branches.

Jobs

A stream computing application could have several "jobs" (i.e., specific applications) executing in parallel, where each job could be associated with an individual data flow. These individual data flows could be thought of as separate operator graphs or portions of the same logical operator graph. In either case, a job or administrator could specify a particular stream of data (e.g., a connection between processing elements or operators in the operator graph) as "exportable", such that a different job could then dynamically connect to the exportable data stream (i.e., import the data stream) (referred to as a "dynamic connection" because both jobs are currently executing when they begin to share the data stream).

Distributing Work

Often, processing elements are distributed across a cluster/network of computer systems in a manner/configuration that best suits performance as dictated by a developer of the stream computing application (e.g., using constructs available via a config statement). Some configuration options are available to the developer are (a) to join a set of operators together to form a single processing element, (b) to host collocate (i.e., placing operators on the same node), or (c) to ex collocate certain operators (i.e., placing operators on different nodes). Such configuration options could be used in production applications.

Need to Assign Processing Elements with respect to External Computing Resources

It has been observed that such stream computing configuration options could be limiting in nature when stream computing applications involve (i) reading/writing from a database and/or a message queue, and/or (ii) writing to shared disk. There is a need to be able to deploy processing elements as they relate to external computing resources (e.g., data sources/sinks).

Referring to FIG. 1A, in an exemplary embodiment, the present invention is configured to perform an operation 110 of receiving, by a computer system, performance requirements data of a plurality of processing elements of a computer software application, where the processing elements are configured to execute on a stream computing system, where the stream computing system includes a network of stream computing servers, an operation 112 of receiving, by the computer system, resource characteristics data of at least one computing resource external to the stream computing system, an operation 114 of receiving, by the computer system, performance characteristics data of the stream computing servers, and an operation 116 of in response to receiving by the computer system a request from at least one processing element among the processing elements to communicate with the at least one computing resource external to the stream computing system, assigning, by the computer system, the at least one processing element to at least one stream computing server among the stream computing servers as a function of the performance requirements data, the resource characteristics data, and the performance characteristics data.

In an embodiment, the present invention places operators/processing elements onto stream computing servers based on at least external interfaces with which such operators communicate. In an embodiment, the present invention places operators/processing elements onto stream computing servers at application start up time and in some ongoing dynamic manner at runtime. For example, the present invention could use both historical access times to a given source/computing resource from different machines/stream computing servers as well as current runtimes using run time checks such as "ping" (e.g., heartbeat checks to the external location). In an embodiment, the present invention conserves available bandwidth on one or more inter-process communication paths.

Figure 9:
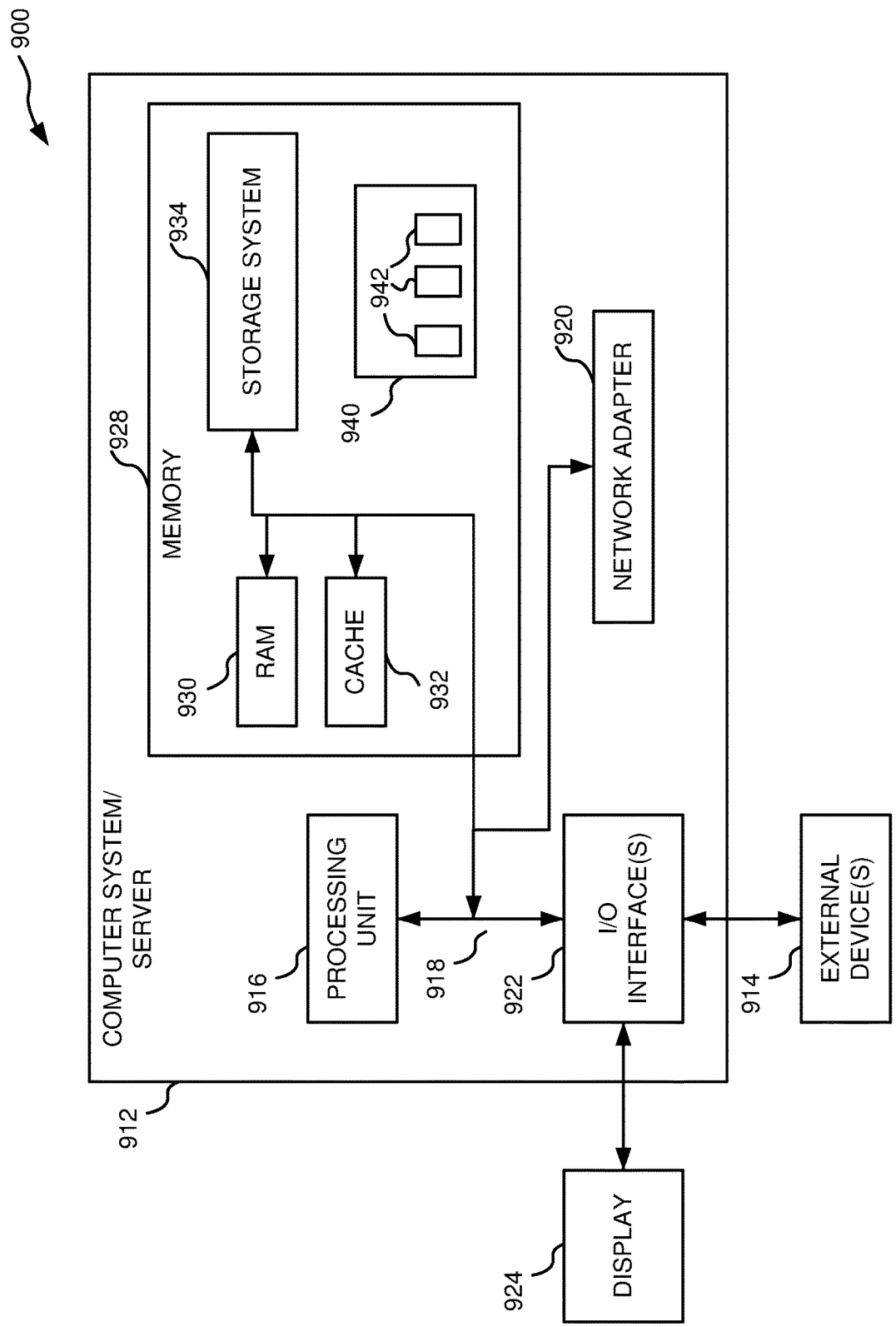
FIG. 9 depicts a computer system in accordance with an exemplary embodiment of the present invention.

In an exemplary embodiment, the computer system is a standalone computer system, such as computer system 900 shown in FIG. 9, a network of distributed computers, where at least some of the computers are computer systems such as computer system 900 shown in FIG. 9, or a cloud computing node server, such as computer system 900 shown in FIG. 9. In an embodiment, the computer system is a computer system 900 as shown in FIG. 9, that executes an assigning processing elements to stream computing servers with respect to external computing resources script or computer software application that carries out the operations of at least method 100. In an embodiment, the computer system is a computer system/server 912 as shown in FIG. 9, that executes an assigning processing elements to stream computing servers with respect to external computing resources script or computer software application that carries out the operations of at least method 100. In an embodiment, the computer system is a processing unit 916 as shown in FIG. 9, that executes an assigning processing elements to stream computing servers with respect to external computing resources script or computer software application that carries out the operations of at least method 100. In an embodiment, the computer system is a stream computing manager system (e.g., a stream runtime system) that executes an assigning processing elements to stream computing servers with respect to external computing resources script or computer software application that carries out the operations of at least method 100. In an embodiment, the computer system is a computer system 900 as shown in FIG. 9, that executes an assigning processing elements to stream computing servers with respect to external computing resources script or computer software application that carries out at least operations 110, 112, 114, and 116. In an embodiment, the computer system is a computer system/server 912 as shown in FIG. 9, that executes an assigning processing elements to stream computing servers with respect to external computing resources script or computer software application that carries out at least operations 110, 112, 114, and 116. In an embodiment, the computer system is a processing unit 916 as shown in FIG. 9, that executes an assigning processing elements to stream computing servers with respect to external computing resources script or computer software application that carries out at least operations 110, 112, 114, and 116. In an embodiment, the computer system is a stream computing manager system/stream manager (e.g., a stream runtime system) that executes an assigning processing elements to stream computing servers with respect to external computing resources script or computer software application that carries out at least operations 110, 112, 114, and 116.

Figure 1B:
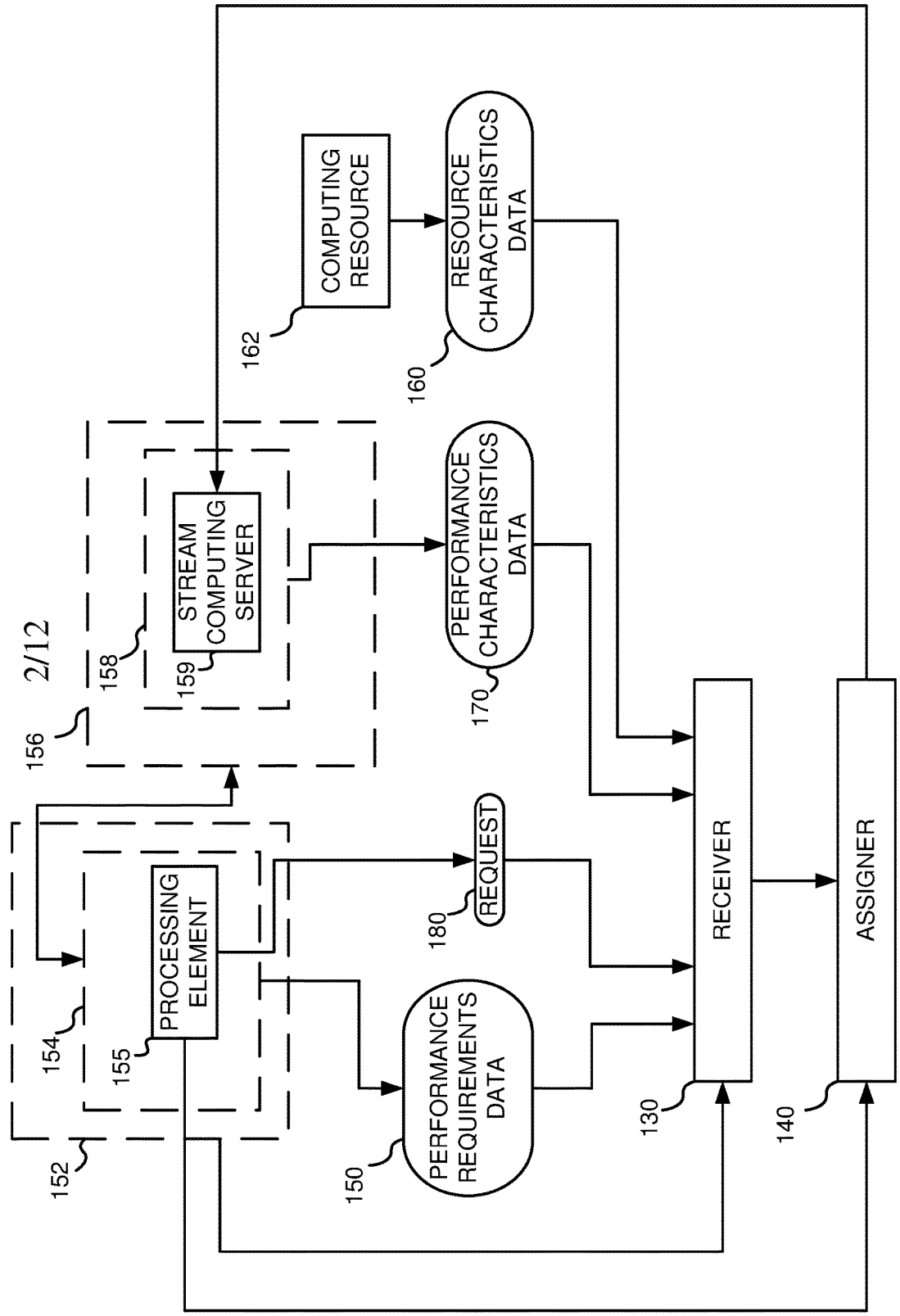
FIG. 1B depicts a block diagram in accordance with an exemplary embodiment of the present invention.

Referring to FIG. 1B, in an exemplary embodiment, the present invention includes a receiver 130 and an assigner 140. In an embodiment, receiver 130 is configured to receive performance requirements data 150 of a plurality of processing elements 154 of a computer software application 152 (e.g., a stream computing application), where processing elements 154 are configured to execute on a stream computing system 156, where stream computing system 156 includes a network of stream computing servers 158. In an embodiment, receiver 130 includes a computer system, such as computer system 900 as shown in FIG. 9, performing operation 110. In an embodiment, receiver 130 includes a computer system, such as computer system/server 912 as shown in FIG. 9, performing operation 110. In an embodiment, receiver 130 includes a computer system, such as processing unit 916 as shown in FIG. 9, performing operation 110. In an embodiment, receiver 130 is a stream computing manager system (e.g., a stream runtime system) performing operation 110. In an embodiment, receiver 130 is implemented as computer software executing on a computer system, such as computer system 900 as shown in FIG. 9, such that the computer system performs operation 110. In an embodiment, receiver 130 is implemented as computer software executing on a computer system, such as computer system/server 912 as shown in FIG. 9, such that the computer system performs operation 110. In an embodiment, receiver 130 is implemented as computer software executing on a computer system, such as processing unit 916 as shown in FIG. 9 such that the computer system performs operation 110. In an embodiment, receiver 130 is implemented as computer software executing on a computer system, such as a stream computing manager system (e.g., a stream runtime system), such that the computer system performs operation 110. In an embodiment, receiver 130 performs operation 110 as computer software executing on a processor/processing unit of receiver 130.

In an embodiment, receiver 130 is configured to receive resource characteristics data 160 of at least one computing resource 162 external to stream computing system 156. In an embodiment, receiver 130 includes a computer system, such as computer system 900 as shown in FIG. 9, performing operation 112. In an embodiment, receiver 130 includes a computer system, such as computer system/server 912 as shown in FIG. 9, performing operation 112. In an embodiment, receiver 130 includes a computer system, such as processing unit 916 as shown in FIG. 9, performing operation 112. In an embodiment, receiver 130 is a stream computing manager system (e.g., a stream runtime system) performing operation 112. In an embodiment, receiver 130 is implemented as computer software executing on a computer system, such as computer system 900 as shown in FIG.

9, such that the computer system performs operation 112. In an embodiment, receiver 130 is implemented as computer software executing on a computer system, such as computer system/server 912 as shown in FIG. 9, such that the computer system performs operation 112. In an embodiment, receiver 130 is implemented as computer software executing on a computer system, such as processing unit 916 as shown in FIG. 9 such that the computer system performs operation 112. In an embodiment, receiver 130 is implemented as computer software executing on a computer system, such as a stream computing manager system (e.g., a stream runtime system), such that the computer system performs operation 112. In an embodiment, receiver 130 performs operation 112 as computer software executing on a processor/processing unit of receiver 130.

In an embodiment, receiver 130 is configured to receive performance characteristics data 170 of stream computing servers 158. In an embodiment, receiver 130 includes a computer system, such as computer system 900 as shown in FIG. 9, performing operation 114. In an embodiment, receiver 130 includes a computer system, such as computer system/server 912 as shown in FIG. 9, performing operation 114. In an embodiment, receiver 130 includes a computer system, such as processing unit 916 as shown in FIG. 9, performing operation 114. In an embodiment, receiver 130 is a stream computing manager system (e.g., a stream runtime system) performing operation 114. In an embodiment, receiver 130 is implemented as computer software executing on a computer system, such as computer system 900 as shown in FIG. 9, such that the computer system performs operation 114. In an embodiment, receiver 130 is implemented as computer software executing on a computer system, such as computer system/server 912 as shown in FIG. 9, such that the computer system performs operation 114. In an embodiment, receiver 130 is implemented as computer software executing on a computer system, such as processing unit 916 as shown in FIG. 9 such that the computer system performs operation 114. In an embodiment, receiver 130 is implemented as computer software executing on a computer system, such as a stream computing manager system (e.g., a stream runtime system), such that the computer system performs operation 114. In an embodiment, receiver 130 performs operation 114 as computer software executing on a processor/processing unit of receiver 130.

In an embodiment, assigner 140 is configured to assign at least one processing element 155 among processing elements 154 to at least one stream computing server 159 among stream computing servers 158 as a function of performance requirements data 150, resource characteristics data 160, and performance characteristics data 170, in response to receiver 130 receiving a request 180 from at least one processing element 155 to communicate with at least one computing resource 162 external to stream computing system 156. In an embodiment, assigner 140 includes a computer system, such as computer system 900 as shown in FIG. 9, performing operation 116. In an embodiment, assigner 140 includes a computer system, such as computer system/server 912 as shown in FIG. 9, performing operation 116. In an embodiment, assigner 140 includes a computer system, such as processing unit 916 as shown in FIG. 9, performing operation 116. In an embodiment, assigner 140 is a stream computing manager system (e.g., a stream runtime system) performing operation 116. In an embodiment, assigner 140 is implemented as computer software executing on a computer system, such as computer system 900 as shown in FIG. 9, such that the computer system performs operation 116. In an embodiment, assigner 140 is implemented as computer software executing on a computer system, such as computer system/server 912 as shown in FIG. 9, such that the computer system performs operation 116. In an embodiment, assigner 140 is implemented as computer software executing on a computer system, such as processing unit 916 as shown in FIG. 9 such that the computer system performs operation 116. In an embodiment, assigner 140 is implemented as computer software executing on a computer system, such as a stream computing manager system (e.g., a stream runtime system), such that the computer system performs operation 116. In an embodiment, assigner 140 performs operation 116 as computer software executing on a processor/processing unit of assigner 140.

Receiving Performance Requirements Data

In an exemplary embodiment, the receiving the performance requirements data includes receiving the performance requirements data at one of a startup time of the computer software application and a runtime of the computer software application. In an exemplary embodiment, receiving operation 110 includes an operation of receiving the performance requirements data at one of a startup time of the computer software application and a runtime of the computer software application. In an embodiment, receiver 130 is configured to receive performance requirements data 150 at one of a startup time of computer software application 152 and a runtime of computer software application 152. In an embodiment, receiver 130 includes a computer system, such as computer system 900 as shown in FIG. 9, receiving performance requirements data 150 at one of a startup time of computer software application 152 and a runtime of computer software application 152. In an embodiment, receiver 130 includes a computer system, such as computer system/server 912 as shown in FIG. 9, receiving performance requirements data 150 at one of a startup time of computer software application 152 and a runtime of computer software application 152. In an embodiment, receiver 130 includes a computer system, such as processing unit 916 as shown in FIG. 9, receiving performance requirements data 150 at one of a startup time of computer software application 152 and a runtime of computer software application 152. In an embodiment, receiver 130 is a stream computing manager system (e.g., a stream runtime system) receiving performance requirements data 150 at one of a startup time of computer software application 152 and a runtime of computer software application 152.

In an embodiment, receiver 130 is implemented as computer software executing on a computer system, such as computer system 900 as shown in FIG. 9, such that the computer system receives performance requirements data 150 at one of a startup time of computer software application 152 and a runtime of computer software application 152. In an embodiment, receiver 130 is implemented as computer software executing on a computer system, such as computer system/server 912 as shown in FIG. 9, such that the computer system receives performance requirements data 150 at one of a startup time of computer software application 152 and a runtime of computer software application 152. In an embodiment, receiver 130 is implemented as computer software executing on a computer system, such as processing unit 916 as shown in FIG. 9 such that the computer system receives performance requirements data 150 at one of a startup time of computer software application 152 and a runtime of computer software application 152. In an embodiment, receiver 130 is implemented as computer software executing on a computer system, such as a stream computing manager system (e.g., a stream runtime system), such that the computer system receives performance requirements data 150 at one of a startup time of computer software application 152 and a runtime of computer software application 152. In an embodiment, receiver 130 receives performance requirements data 150 at one of a startup time of computer software application 152 and a runtime of computer software application 152 as computer software executing on a processor/processing unit of receiver 130.

Receiving Metadata

In a particular embodiment, the receiving the performance requirements data at the startup time of the computer software application includes receiving metadata of the processing elements of the computer software application at the startup time of the computer software application. In a particular embodiment, receiving operation 110 includes an operation of receiving metadata of the processing elements of the computer software application at the startup time of the computer software application. In an embodiment, receiver 130 is configured to receive metadata of processing elements 154 of computer software application 152 at the startup time of computer software application 152. In an embodiment, receiver 130 includes a computer system, such as computer system 900 as shown in FIG. 9, receiving metadata of processing elements 154 of computer software application 152 at the startup time of computer software application 152. In an embodiment, receiver 130 includes a computer system, such as computer system/server 912 as shown in FIG. 9, receiving metadata of processing elements 154 of computer software application 152 at the startup time of computer software application 152. In an embodiment, receiver 130 includes a computer system, such as processing unit 916 as shown in FIG. 9, receiving metadata of processing elements 154 of computer software application 152 at the startup time of computer software application 152. In an embodiment, receiver 130 is a stream computing manager system (e.g., a stream runtime system) receiving metadata of processing elements 154 of computer software application 152 at the startup time of computer software application 152.

In an embodiment, receiver 130 is implemented as computer software executing on a computer system, such as computer system 900 as shown in FIG. 9, such that the computer system receives metadata of processing elements 154 of computer software application 152 at the startup time of computer software application 152. In an embodiment, receiver 130 is implemented as computer software executing on a computer system, such as computer system/server 912 as shown in FIG. 9, such that the computer system receives metadata of processing elements 154 of computer software application 152 at the startup time of computer software application 152. In an embodiment, receiver 130 is implemented as computer software executing on a computer system, such as processing unit 916 as shown in FIG. 9 such that the computer system receives metadata of processing elements 154 of computer software application 152 at the startup time of computer software application 152. In an embodiment, receiver 130 is implemented as computer software executing on a computer system, such as a stream computing manager system (e.g., a stream runtime system), such that the computer system receives metadata of processing elements 154 of computer software application 152 at the startup time of computer software application 152. In an embodiment, receiver 130 receives metadata of processing elements 154 of computer software application 152 at the startup time of computer software application 152 as computer software executing on a processor/processing unit of receiver 130.

Receiving Resource Characteristics Data

In an exemplary embodiment, the receiving the resource characteristics data includes receiving the resource characteristics data at one of a startup time of the computer software application and a runtime of the computer software application. In an exemplary embodiment, receiving operation 112 includes an operation of receiving the resource characteristics data at one of a startup time of the computer software application and a runtime of the computer software application. In an embodiment, receiver 130 is configured to receive resource characteristics data 160 at one of a startup time of computer software application 152 and a runtime of computer software application 152. In an embodiment, receiver 130 includes a computer system, such as computer system 900 as shown in FIG. 9, receiving resource characteristics data 160 at one of a startup time of computer software application 152 and a runtime of computer software application 152. In an embodiment, receiver 130 includes a computer system, such as computer system/server 912 as shown in FIG. 9, receiving resource characteristics data 160 at one of a startup time of computer software application 152 and a runtime of computer software application 152. In an embodiment, receiver 130 includes a computer system, such as processing unit 916 as shown in FIG. 9, receiving resource characteristics data 160 at one of a startup time of computer software application 152 and a runtime of computer software application 152. In an embodiment, receiver 130 is a stream computing manager system (e.g., a stream runtime system) receiving resource characteristics data 160 at one of a startup time of computer software application 152 and a runtime of computer software application 152.

In an embodiment, receiver 130 is implemented as computer software executing on a computer system, such as computer system 900 as shown in FIG. 9, such that the computer system receives resource characteristics data 160 at one of a startup time of computer software application 152 and a runtime of computer software application 152. In an embodiment, receiver 130 is implemented as computer software executing on a computer system, such as computer system/server 912 as shown in FIG. 9, such that the computer system receives resource characteristics data 160 at one of a startup time of computer software application 152 and a runtime of computer software application 152. In an embodiment, receiver 130 is implemented as computer software executing on a computer system, such as processing unit 916 as shown in FIG. 9 such that the computer system receives resource characteristics data 160 at one of a startup time of computer software application 152 and a runtime of computer software application 152. In an embodiment, receiver 130 is implemented as computer software executing on a computer system, such as a stream computing manager system (e.g., a stream runtime system), such that the computer system receives resource characteristics data 160 at one of a startup time of computer software application 152 and a runtime of computer software application 152. In an embodiment, receiver 130 receives resource characteristics data 160 at one of a startup time of computer software application 152 and a runtime of computer software application 152 as computer software executing on a processor/processing unit of receiver 130.

Receiving Performance Characteristics Data

In an exemplary embodiment, the receiving the performance characteristics data includes receiving the performance characteristics data at one of a startup time of the computer software application and a runtime of the computer software application. In an exemplary embodiment, receiving operation 114 includes an operation of receiving the performance characteristics data at one of a startup time of the computer software application and a runtime of the computer software application. In an embodiment, receiver 130 is configured to receive performance characteristics data 170 at one of a startup time of computer software application 152 and a runtime of computer software application 152. In an embodiment, receiver 130 includes a computer system, such as computer system 900 as shown in FIG. 9, receiving performance characteristics data 170 at one of a startup time of computer software application 152 and a runtime of computer software application 152. In an embodiment, receiver 130 includes a computer system, such as computer system/server 912 as shown in FIG. 9, receiving performance characteristics data 170 at one of a startup time of computer software application 152 and a runtime of computer software application 152. In an embodiment, receiver 130 includes a computer system, such as processing unit 916 as shown in FIG. 9, receiving performance characteristics data 170 at one of a startup time of computer software application 152 and a runtime of computer software application 152. In an embodiment, receiver 130 is a stream computing manager system (e.g., a stream runtime system) receiving performance characteristics data 170 at one of a startup time of computer software application 152 and a runtime of computer software application 152.

In an embodiment, receiver 130 is implemented as computer software executing on a computer system, such as computer system 900 as shown in FIG. 9, such that the computer system receives performance characteristics data 170 at one of a startup time of computer software application 152 and a runtime of computer software application 152. In an embodiment, receiver 130 is implemented as computer software executing on a computer system, such as computer system/server 912 as shown in FIG. 9, such that the computer system receives performance characteristics data 170 at one of a startup time of computer software application 152 and a runtime of computer software application 152. In an embodiment, receiver 130 is implemented as computer software executing on a computer system, such as processing unit 916 as shown in FIG. 9 such that the computer system receives performance characteristics data 170 at one of a startup time of computer software application 152 and a runtime of computer software application 152. In an embodiment, receiver 130 is implemented as computer software executing on a computer system, such as a stream computing manager system (e.g., a stream runtime system), such that the computer system receives performance characteristics data 170 at one of a startup time of computer software application 152 and a runtime of computer software application 152. In an embodiment, receiver 130 receives performance characteristics data 170 at one of a startup time of computer software application 152 and a runtime of computer software application 152 as computer software executing on a processor/processing unit of receiver 130.

Assigning Processing Elements

Figure 2:
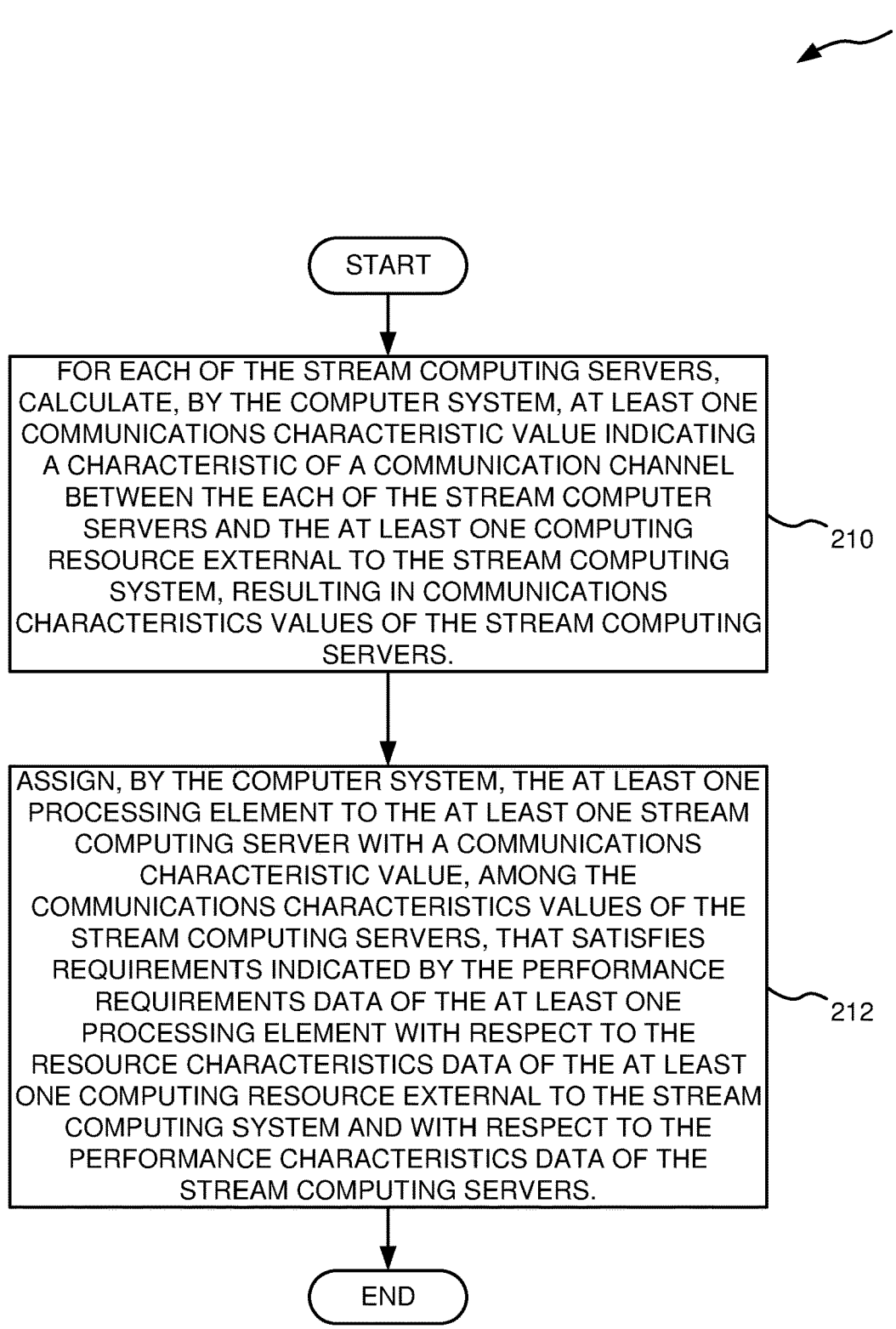
FIG. 2 depicts a flowchart in accordance with an exemplary embodiment of the present invention.

In an exemplary embodiment, the assigning includes (a) for each of the stream computing servers, calculating, by the computer system, at least one communications characteristic value indicating a characteristic of a communication channel between the each of the stream computer servers and the at least one computing resource external to the stream computing system, resulting in communications characteristics values of the stream computing servers, and (2) assigning, by the computer system, the at least one processing element to the at least one stream computing server with a commu-nications characteristic value, among the communications characteristics values of the stream computing servers, that satisfies requirements indicated by the performance requirements data of the at least one processing element with respect to the resource characteristics data of the at least one computing resource external to the stream computing system and with respect to the performance characteristics data of the stream computing servers. Referring to FIG. 2, in an exemplary embodiment, assigning operation 116 includes an operation 210 of for each of the stream computing servers, calculating, by the computer system, at least one communications characteristic value indicating a characteristic of a communication channel between the each of the stream computer servers and the at least one computing resource external to the stream computing system, resulting in communications characteristics values of the stream computing servers, and an operation 212 of assigning, by the computer system, the at least one processing element to the at least one stream computing server with a communications characteristic value, among the communications characteristics values of the stream computing servers, that satisfies requirements indicated by the performance requirements data of the at least one processing element with respect to the resource characteristics data of the at least one computing resource external to the stream computing system and with respect to the performance characteristics data of the stream computing servers. In an embodiment, the at least one communications characteristic value indicates a latency of the communication channel. In an embodiment, the at least one communications characteristic value indicates a distance between the each of the stream computer servers and the at least one computing resource external to the stream computing system.

In an embodiment, assigner 140 includes a computer system 900 as shown in FIG. 9, that executes an assigning processing elements to stream computing servers with respect to external computing resources script or computer software application that carries out the operations of at least method 200. In an embodiment, assigner 140 includes a computer system/server 912 as shown in FIG. 9, that executes an assigning processing elements to stream computing servers with respect to external computing resources script or computer software application that carries out the operations of at least method 200. In an embodiment, assigner 140 includes a processing unit 916 as shown in FIG. 9, that executes an assigning processing elements to stream computing servers with respect to external computing resources script or computer software application that carries out the operations of at least method 200. In an embodiment, assigner 140 is a stream computing manager system (e.g., a stream runtime system) that executes an assigning processing elements to stream computing servers with respect to external computing resources script or computer software application that carries out the operations of at least method 200. In an embodiment, assigner 140 includes a computer system 900 as shown in FIG. 9, that executes an assigning processing elements to stream computing servers with respect to external computing resources script or computer software application that carries out at least operations 210 and 212. In an embodiment, assigner 140 includes a computer system/server 912 as shown in FIG. 9, that executes an assigning processing elements to stream computing servers with respect to external computing resources script or computer software application that carries out at least operations 210 and 212. In an embodiment, assigner 140 includes a processing unit 916 as shown in FIG. 9, that executes an assigning processing elements to stream computing servers with respect to external computing resources script or computer software application that carries out at least operations 210 and 212. In an embodiment, assigner 140 is a stream computing manager system (e.g., a stream runtime system) that executes an assigning processing elements to stream computing servers with respect to external computing resources script or computer software application that carries out at least operations 210 and 212.

In an embodiment, assigner 140 is configured to calculate, for each of stream computing servers 158, at least one communications characteristic value indicating a characteristic of a communication channel between the each of stream computer servers 158 and at least one computing resource 162 external to stream computing system 156, resulting in communications characteristics values of stream computing servers 158. In an embodiment, assigner 140 includes a computer system, such as computer system 900 as shown in FIG. 9, performing operation 210. In an embodiment, assigner 140 includes a computer system, such as computer system/server 912 as shown in FIG. 9, performing operation 210. In an embodiment, assigner 140 includes a computer system, such as processing unit 916 as shown in FIG. 9, performing operation 210. In an embodiment, assigner 140 is a stream computing manager system (e.g., a stream runtime system) performing operation 210. In an embodiment, assigner 140 is implemented as computer software executing on a computer system, such as computer system 900 as shown in FIG. 9, such that the computer system performs operation 210. In an embodiment, assigner 140 is implemented as computer software executing on a computer system, such as computer system/server 912 as shown in FIG. 9, such that the computer system performs operation 210. In an embodiment, assigner 140 is implemented as computer software executing on a computer system, such as processing unit 916 as shown in FIG. 9 such that the computer system performs operation 210. In an embodiment, assigner 140 is implemented as computer software executing on a computer system, such as a stream computing manager system (e.g., a stream runtime system), such that the computer system performs operation 210. In an embodiment, assigner 140 performs operation 210 as computer software executing on a processor/processing unit of assigner 140.

In an embodiment, assigner 140 is configured to assign at least one processing element 155 to at least one stream computing server 159 with a communications characteristic value, among the communications characteristics values of stream computing servers 158, that satisfies requirements indicated by performance requirements data 150 of at least one processing element 155 with respect to resource characteristics data 160 of at least one computing resource 162 external to stream computing system 156 and with respect to performance characteristics data 170 of stream computing servers 158. In an embodiment, assigner 140 includes a computer system, such as computer system 900 as shown in FIG. 9, performing operation 212. In an embodiment, assigner 140 includes a computer system, such as computer system/server 912 as shown in FIG. 9, performing operation 212. In an embodiment, assigner 140 includes a computer system, such as processing unit 916 as shown in FIG. 9, performing operation 212. In an embodiment, assigner 140 is a stream computing manager system (e.g., a stream runtime system) performing operation 212. In an embodiment, assigner 140 is implemented as computer software executing on a computer system, such as computer system 900 as shown in FIG. 9, such that the computer system performs operation 212. In an embodiment, assigner 140 is implemented as computer software executing on a computer system, such as computer system/server 912 as shown in FIG. 9, such that the computer system performs operation 212. In an embodiment, assigner 140 is implemented as computer software executing on a computer system, such as processing unit 916 as shown in FIG. 9 such that the computer system performs operation 212. In an embodiment, assigner 140 is implemented as computer software executing on a computer system, such as a stream computing manager system (e.g., a stream runtime system), such that the computer system performs operation 212. In an embodiment, assigner 140 performs operation 212 as computer software executing on a processor/processing unit of assigner 140.

Stream Computing System

Figure 3:
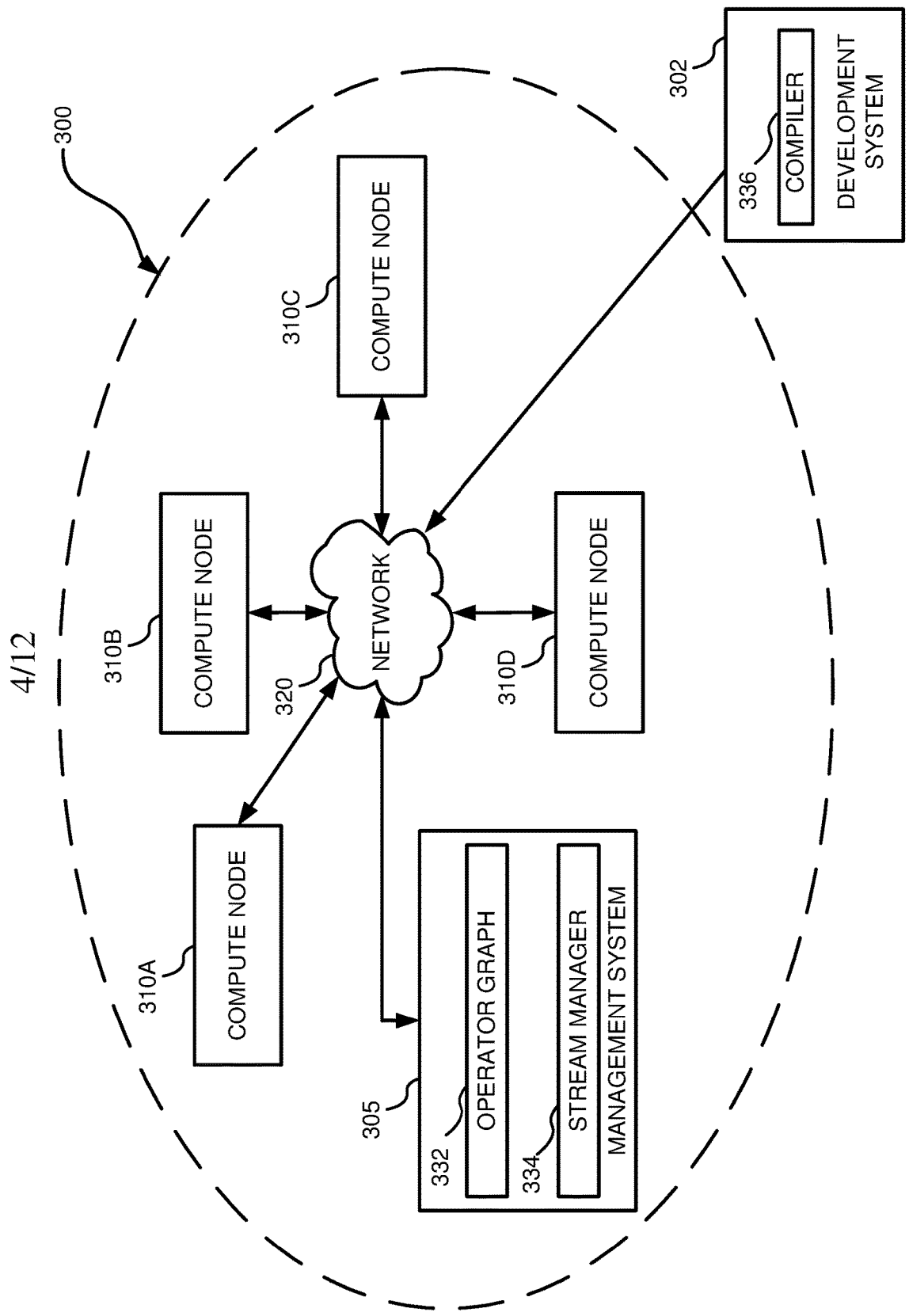
FIG. 3 depicts a block diagram in accordance with an embodiment of the present invention.

Referring to FIG. 3, in an exemplary embodiment, stream computing system 156 includes a computing infrastructure 300 that is configured to execute a stream computing application (e.g., computer software application 152). In an embodiment, computing infrastructure 300 includes a management system 305 and two or more compute nodes 310A, 310B, 310C, 310D (i.e., hosts) (e.g., stream computing servers 158) which are logically and/or communicatively coupled to each other using one or more communications networks 320. For example, communications network 320 could include one or more servers, networks, or databases, and could use a particular communication protocol to transfer data between compute nodes 310A, 310B, 310C, 310D. In an embodiment, a computing development system 302 is logically and/or communicatively coupled with management system 305 and compute nodes 310A, 310B, 310C, 310D, either directly or via communications network 320.

For example, communications network 320 could include a variety of types of physical communication channels or "links", where the links could be wired, wireless, optical, or any other suitable media. In addition, communications network 320 could include a variety of network hardware and software for performing routing, switching, and other functions, such as routers, switches, or bridges. Communications network 320 could be dedicated for use by a stream computing application (e.g., computer software application 152) or shared with other applications and users. Communications network 320 could be any size, such that, for example, communications network 320 could include a single local area network or a wide area network spanning a large geographical area, such as the Internet. In a further example, the links could provide different levels of bandwidth or capacity to transfer data at a particular rate, where the bandwidth that a particular link could provide could vary depending on a variety of factors (e.g., the type of communication media and whether particular network hardware or software is functioning correctly or at full capacity). In addition, for example, the bandwidth that a particular link could provide to a stream computing application (e.g., computer software application 152), could vary (a) if the link were shared with other applications and users, such that the bandwidth could depend on the load placed on the link by the other applications and users and/or (b) depending on a temporal factor (e.g., time of day, day of week, day of month, or season).

Stream Computing Servers

Figure 4:
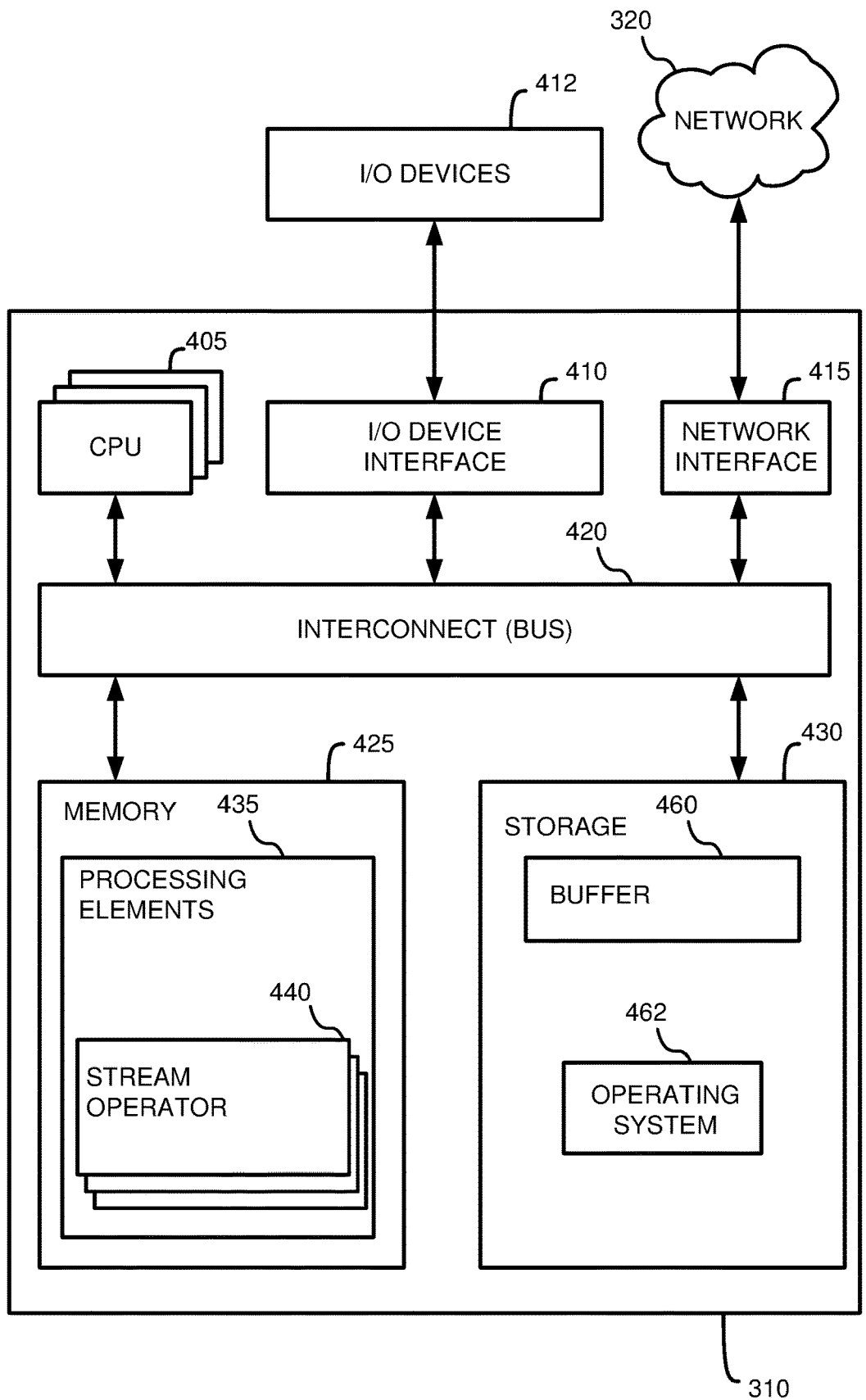
FIG. 4 depicts a block diagram in accordance with an embodiment of the present invention.

Referring to FIG. 4, in an exemplary embodiment, each of stream computing servers 158 is a compute node 310, which could be the same as one of compute nodes 310A, 310B, 310C, 310D. In an embodiment, compute node 310 includes one or more processors/central processing units (CPUs) 405, a network interface 415, an interconnect (bus) 420, a memory 425, and a storage 430 (i.e., storage device). In a further embodiment, compute node 310 includes an input/output (I/O) device interface 410 used to connect I/O devices (e.g., keyboard, display, mouse devices) to compute node 310.

In an embodiment, each CPU 405 retrieves and executes programming instructions stored in memory 425 or storage 430, and stores and retrieves application data residing in memory 425. In an embodiment, interconnect 420 is used to transmit programming instructions and application data between each CPU 405, I/O device interface 410, storage 430, network interface 415, and memory 425. For example, interconnect 420 could be one or more busses. Also, for example, CPUs 405 could be a single CPU, multiple CPUs, or a single CPU having multiple processing cores. In a specific example, processor/CPU 405 could be a digital signal processor (DSP).

In an embodiment, one or more processing elements 435 (e.g., processing elements 154) are stored in memory 425, where processing element 435 includes one or more stream operators 440. In an embodiment, processing element 435 is assigned to be executed by only one CPU 405. In an embodiment, stream operators 440 of processing element 435 include one or more threads that are executed on two or more CPUs 405. For example, memory 425 could be a random access memory (e.g., Static Random Access Memory (SRAM), Dynamic Random Access Memory (DRAM), flash memory). For example, storage 430 could be a non-volatile memory (e.g., hard disk drive, solid state device (SSD), removable memory cards, optical storage, flash memory devices, network attached storage (NAS), connections to storage area network (SAN) devices, other devices) that stores non-volatile data. In an embodiment, network interface 415 is configured to transmit data via communications network 320.

In an embodiment, a stream computing application (e.g., computer software application 152) includes one or more stream operators 440 that may be compiled into a "processing element" container/processing elements 435. In an embodiment, two or more processing elements 435 run on memory 425, such that each processing element 435 has one or more stream operators 440. For example, each stream operator 440 could include a portion of computer software programming code that processes tuples flowing into processing element 435 and outputs tuples to other stream operators 440 in processing element 435, in other processing elements, or in both the same and other processing elements in a stream computing application (e.g., computer software application 152). In an embodiment, processing elements 435 pass tuples to other processing elements that are on the same compute node 310 or on other compute nodes that are accessible via communications network 320. For example, a processing element(s) (e.g., processing element 435) on compute node 310A could output tuples to a processing element(s) on compute node 310B. In an embodiment, storage 430 include a buffer 460. In an alternative embodiment, buffer 460 is located in memory 425 of compute node 310 or in a combination of both memories. In an embodiment, storage 430 includes storage space that is external to compute node 310, such as in a cloud computing system.

In an embodiment, compute node 310 includes one or more operating systems 462. For example, operating system 462 could be stored partially in memory 425 and partially in storage 430. In another example, operating system 462 could be stored entirely in memory 425 or entirely in storage 430. Also, for example, operating system 462 could provide an interface between various hardware resources, including CPU 405, and processing elements 435 and other components of the stream computing application (e.g., computer software application 152). In addition, operating system 462 could provide common services for application programs, such as providing a time function.

Management System

Figure 5:
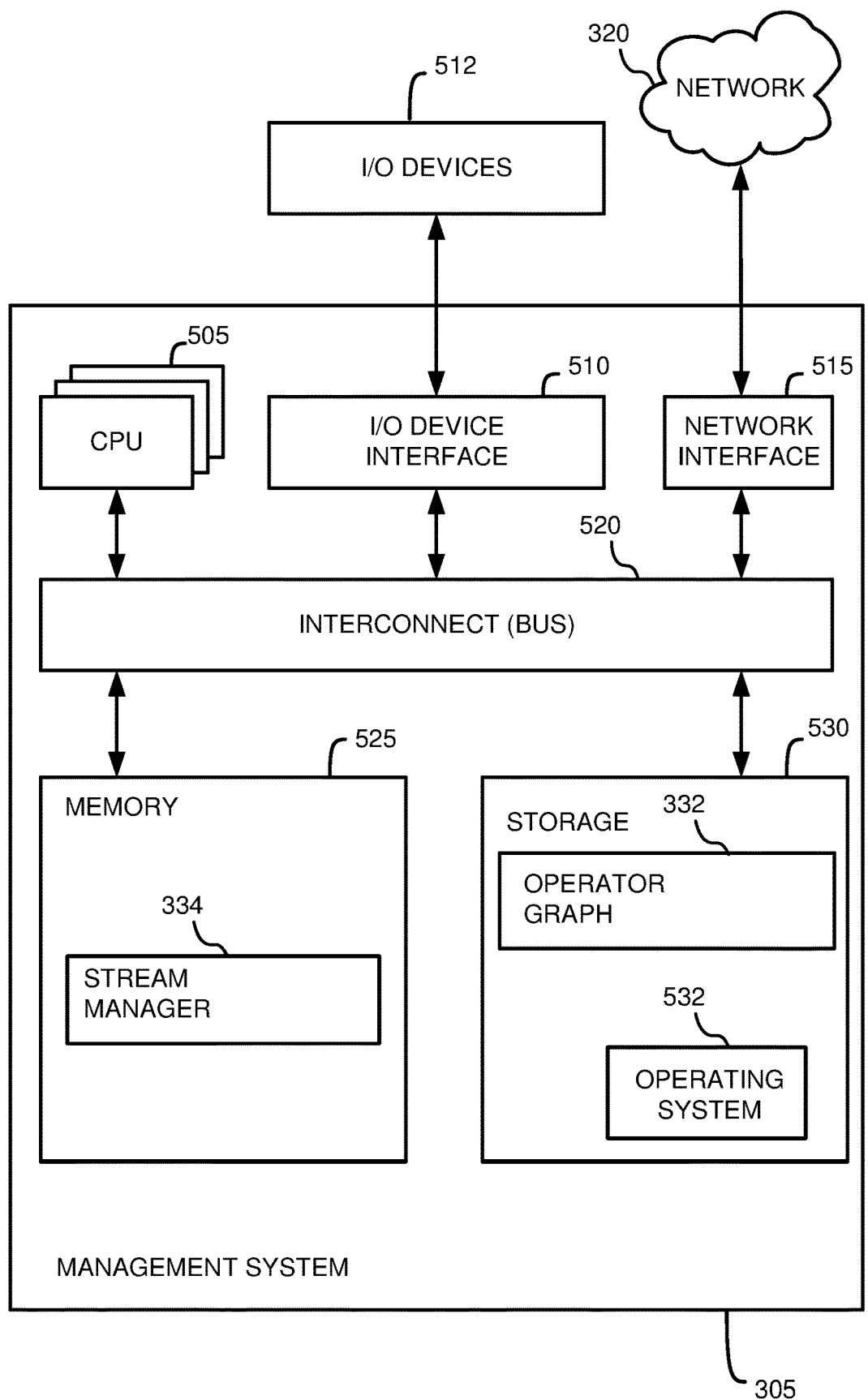
FIG. 5 depicts a block diagram in accordance with an embodiment of the present invention.

Referring to FIG. 5, in an exemplary embodiment, management system 305 includes one or more processors/central processing units (CPUs) 505, a network interface 515, an interconnect (bus) 520, a memory 525, and a storage 530 (i.e., storage device). In a further embodiment, management system 305 includes an input/output (I/O) device interface 510 connecting I/O devices (e.g., keyboard, display, mouse devices) to management system 305.

In an embodiment, each CPU 505 retrieves and executes programming instructions stored in memory 525 or storage 530, and stores and retrieves application data residing in the memory 525 or storage 530. In an embodiment, interconnect 520 is used to move data, such as programming instructions and application data, between CPU 505, I/O device interface 510, storage 530, network interface 515, and memory 525. For example, interconnect 520 could be one or more busses. Also, for example, CPUs 505 may be a single CPU, multiple CPUs, or a single CPU having multiple processing cores. In a specific example, processor/CPU 505 could be a DSP.

For example, memory 525 could be a random access memory (e.g., SRAM, DRAM, flash memory). In another example, storage 530 could be a non-volatile memory (e.g., hard disk drive, solid state device (SSD), removable memory cards, optical storage, flash memory devices, network attached storage (NAS), connections to storage area-network (SAN) devices, cloud storage). In an embodiment, network interface 515 is configured to transmit data via communications network 320. In an embodiment, memory 525 stores stream manager 334. In an embodiment, storage 530 stores operator graph 332. In a particular embodiment, operator graph 332 define how tuples are routed to processing elements 435 for processing.

In an embodiment, management system 305 includes one or more operating systems 532. For example, operating system 532 could be stored partially in memory 525 and partially in storage 530. In another example, operating system 532 could be stored entirely in memory 525 or entirely in storage 530. Also, for example, operating system 532 could provide an interface between various hardware resources, including CPU 505, and processing elements 435 and other components of the stream computing application (e.g., computer software application 152). In addition, operating system 532 could provide common services for application programs, such as providing a time function.

Development System

Figure 6:
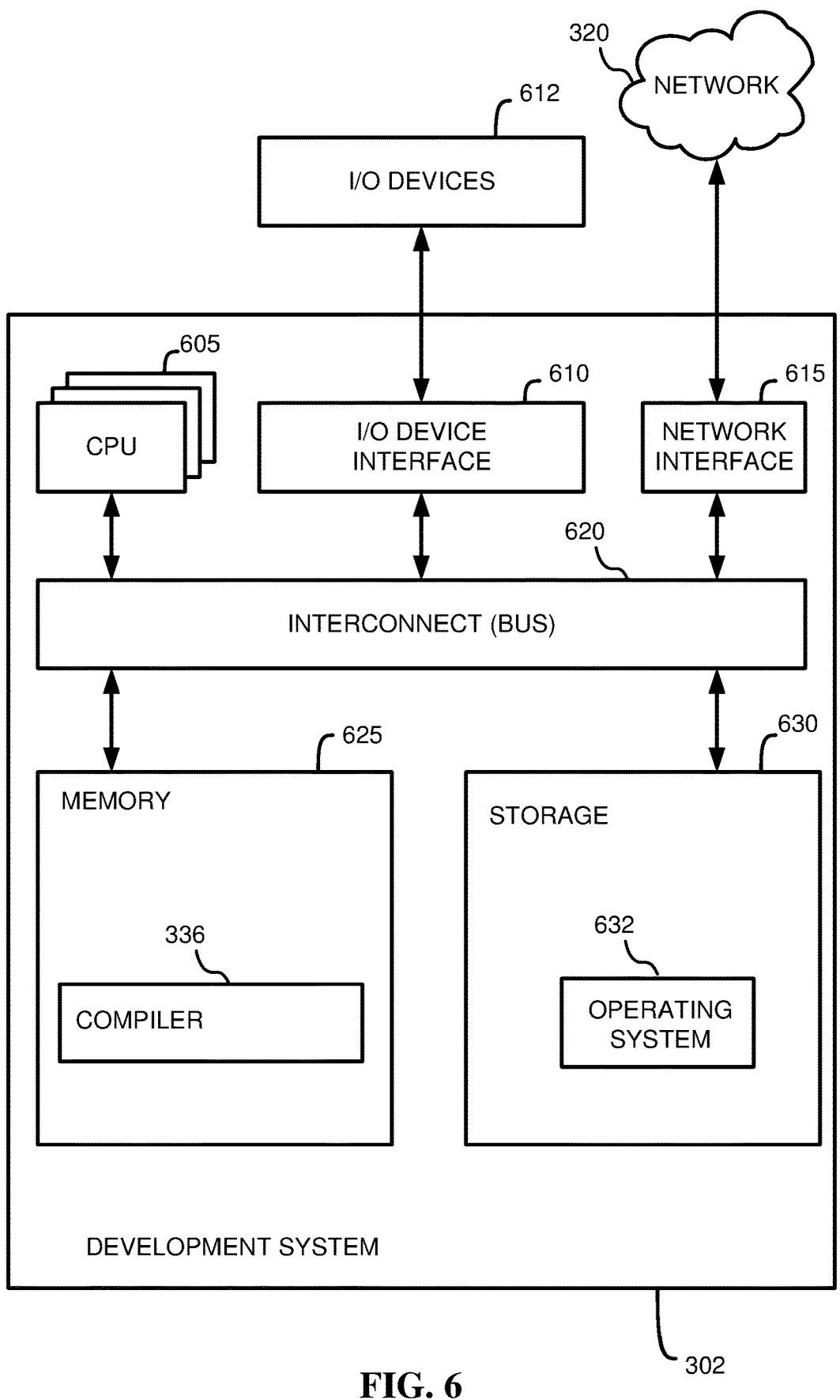
FIG. 6 depicts a block diagram in accordance with an embodiment of the present invention.

Referring to FIG. 6, in an exemplary embodiment, development system 302 includes one or more processors/central processing units (CPUs) 605, a network interface 615, an interconnect (bus) 620, a memory 625, and a storage 630 (i.e., storage device). In a further embodiment, development system 302 includes an input/output (I/O) device interface 610 connecting I/O devices (e.g., keyboard, display, mouse devices) to development system 302.

In an embodiment, CPU 605 retrieves and executes programming instructions stored in memory 625 or storage 630, and stores and retrieves application data residing in memory 625 or storage 630. In an embodiment, interconnect 620 is used to move data, such as programming instructions and application data, between the CPU 605, I/O device interface 610, storage 630, network interface 615, and memory 625. For example, interconnect 620 could be one or more busses.

Also, for example, CPUs 605 may be a single CPU, multiple CPUs, or a single CPU having multiple processing cores. In a specific example, processor/CPU 605 could be a DSP.

For example, memory 625 could be a random access memory (e.g., SRAM, DRAM, flash memory). In another example, storage 630 could be a non-volatile memory (e.g., hard disk drive, solid state device (SSD), removable memory cards, optical storage, flash memory devices, network attached storage (NAS), connections to storage area-network (SAN) devices, cloud storage). In an embodiment, network interface 615 is configured to transmit data via communications network 320.

In an embodiment, development system 302 includes one or more operating systems 632. For example, operating system 632 may be stored partially in memory 625 and partially in storage 630. In another example, operating system 632 could be stored entirely in memory 625 or entirely in storage 630. Also, for example, operating system 632 could provide an interface between various hardware resources, including CPU 605, and processing elements 435 and other components of the stream computing application (e.g., computer software application 152). In addition, operating system 632 could provide common services for application programs, such as providing a time function.

In an embodiment, memory 625 stores compiler 336. In a particular embodiment, compiler 336 compiles modules, which include source code or statements, into the object code, which includes machine instructions that execute on a processor/CPU. For example, compiler 336 could translate the modules into an intermediate form before translating the intermediate form into object code. In another example, compiler 336 could output a set of deployable artifacts that could include a set of processing elements and an application description language file (ADL file), which is a configuration file that describes the stream computing application (e.g., computer software application 152). For example, compiler 336 could be a just-in-time compiler that executes as part of an interpreter. In another example, compiler 336 could be an optimizing compiler. For example, compiler 336 could perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. In an embodiment, the output of compiler 336 may be represented by an operator graph, (e.g., operator graph 332).

In an embodiment, compiler 336 provides an application administrator with the ability to optimize performance through profile-driven fusion optimization. For example, fusing operators could improve performance by reducing the number of calls to a transport. In a further example, while fusing stream operators could provide faster communication between operators than could be available using inter-process communication techniques, a decision to fuse operators could require balancing the benefits of distributing processing across multiple compute nodes with the benefit of faster inter-operator communications. In an embodiment, compiler 336 automates the fusion process to determine how to best fuse the operators to be hosted by one or more processing elements (e.g., processing elements 435), while respecting user-specified constraints. For example, automating the fusion process could be a two-step process, including compiling the application in a profiling mode and running the application, then re-compiling and using the optimizer during this subsequent compilation, with the end result perhaps being a compiler-supplied deployable application with an optimized application configuration.

Operator Graph

Figure 7:
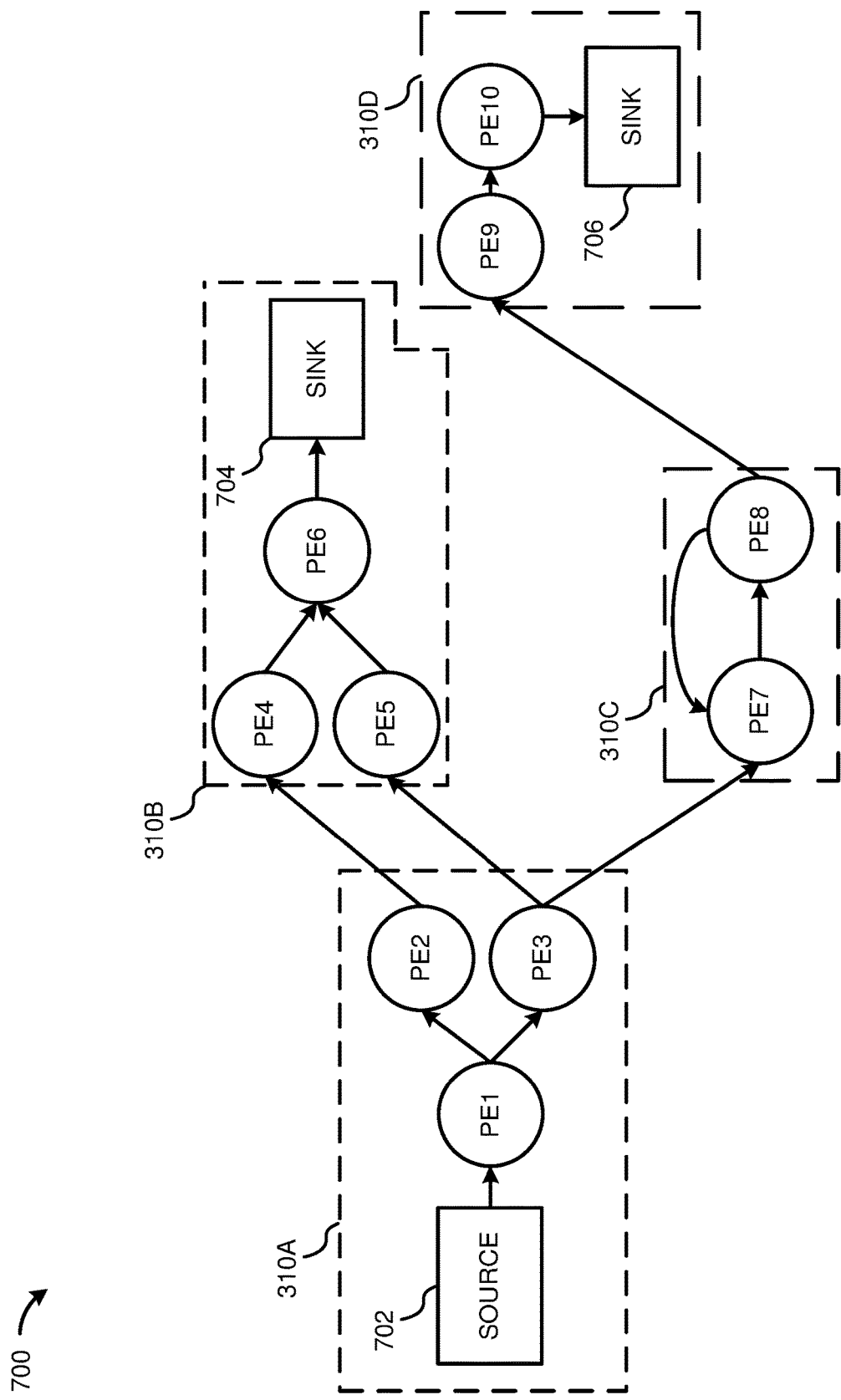
FIG. 7 depicts a block diagram in accordance with an embodiment of the present invention.

Referring to FIG. 7, in an exemplary embodiment, operator graph 332 is an operator graph 700 for a stream computing application (e.g., computer software application 152) beginning from one or more sources 702 (i.e., operator sources) through to one or more sinks 704, 706 (i.e., operator sinks). For example, the flow from one or more sources 702 through to one or more sinks 704, 706 could be an execution path, while a flow from one processing element (e.g., processing elements 154, 155, 435, PE1, PE2, PE3, PE4, PE5, PE6, PE7, PE8, PE9, PE10) to another (e.g., processing elements 154, 435, PE1, PE2, PE3, PE4, PE5, PE6, PE7, PE8, PE9, PE10) could be an execution path. In an embodiment, operator graph 700 includes connected processing elements PE1, PE2, PE3, PE4, PE5, PE6, PE7, PE8, PE9, and PE10. In an embodiment, operator graph 700 includes data flows between stream operators 440 within the same or different processing elements (e.g., processing elements 154, 435, PE1, PE2, PE3, PE4, PE5, PE6, PE7, PE8, PE9, PE10). For example, processing elements 154, 435 (e.g., processing elements PE1, PE2, PE3, PE4, PE5, PE6, PE7, PE8, PE9, PE10) could receive tuples from a stream as well as output tuples into the stream (except for a sink (e.g., sink 704, 706) (where the stream terminates), or a source (e.g., source 702) (where the stream begins)). In another example, operator graph 700 could include many individual operator graphs that may be statically or dynamically linked together.

In an embodiment, operator graph 700 includes processing elements PE1, PE2, PE3, PE4, PE5, PE6, PE7, PE8, PE9, PE10 running on compute nodes 310A, 310B, 310C, 310D. In a particular embodiment, a processing element (e.g., processing element 155) among processing elements 154, 435 (e.g., processing elements PE1, PE2, PE3, PE4, PE5, PE6, PE7, PE8, PE9, PE10) includes one or more stream operators 440 fused together to form an independently running process with its own process identifier (ID) (PID) and memory space. For example, if two (or more) processing elements 154, 435 were running independently, inter-process communication could occur using a "transport" (e.g., network socket, TCP/IP socket, shared memory). In a further example, inter-process communication paths used for inter-process communications could be a resource in a stream computing application (e.g., computer software application 152). In an example, if stream operators were fused together, the fused stream operators could use more rapid communication techniques for passing tuples among stream operators in each processing element 154, 435.

In an embodiment, operator graph 700 begins at source 702 and ends at sink 704, 706. For example, compute node 310A could processing elements PE1, PE2, and PE3, with source 702 flowing into processing element PE1, with processing element PE1 outputting tuples that are received by processing elements PE2 and PE3. In a further example, processing element PE1 could split data attributes received in a tuple and pass some data attributes in a new tuple to processing element PE2, while passing other data attributes in another new tuple to processing element PE3. In another example, processing element PE1 could pass some received tuples to processing element PE2 while passing other tuples to processing element PE3. In a further example, stream operators (e.g., stream operators 440) contained in processing element PE2 could process tuples that flow to processing element PE2, with processing element PE2 outputting the resulting tuples to processing element PE4 on compute node 310B. In addition, for example, the tuples outputted by processing element PE4 could flow to sink 704 via processing element PE6 (i.e., a sink processing element). Also, for example, tuples flowing from processing element PE3 to processing element PE5 could flow to sink 704 via processing element PE6 (i.e., a sink processing element). Thus, for example, processing element PE6 could be a sink for operator graph 700 and could be configured to perform a join operation, combining tuples received from processing elements PE4 and PE5. In a further example, tuples could flow from processing element PE3 to processing element PE7 on compute node 310C, with tuples flowing from processing element PE7 to processing element PE8 and looping back to processing element PE7. In a further example, tuples outputted from processing element PE8 could flow to processing element PE9 on compute node 310D, with compute node 310D outputting tuples to be processed by operators in a sink processing element (e.g., processing element PE10, sink 706).

For example, the tuple received by a particular processing element 154, 435 may not be the same tuple that is outputted downstream since the output tuple could be changed in some way. In a specific example, an attribute or metadata in the output tuple could be added, deleted, or changed (e.g., by a processing element). In another example, a particular tuple output by a processing element (e.g., processing elements 154, 435, PE1, PE2, PE3, PE4, PE5, PE6, PE7, PE8, PE9, PE10) may not be the same tuple as a corresponding input tuple even if the input tuple were not changed by the processing element. In an example, an output tuple that has the same data attributes as a corresponding input tuple could be the same tuple.

In an embodiment, processing elements 154, 435 are configured to receive or output tuples in various formats (e.g., processing elements or stream operators could exchange data marked up as XML documents). For example, each stream operator 440 within a processing element 154, 435 could carry out any form of data processing functions on received tuples (e.g., writing to database tables, performing other database operations (e.g., data joins, splits, reads) and could perform other data analytic functions or operations.

In an embodiment, stream manager 334 is configured to monitor a stream computing application (e.g., computer software application 152) running on compute nodes (e.g., compute nodes 310A, 310B, 310C, 310D) and is configured to change the deployment of an operator graph (e.g., operator graph 332). For example, stream manager 334 could move processing elements 154, 435 from one compute node 310 to another, for example, to manage the processing loads of compute nodes 310A, 310B, 310C, 310D. In a further example, stream manager 334 could control the stream computing application (e.g., computer software application 152) by inserting, removing, fusing, un-fusing, or otherwise modifying processing elements 154, 435 and stream operators 440 (or what tuples flow to processing elements 154, 435) running on compute nodes 310A, 310B, 310C, 310D. In an example, processing element 154, 435, could be a collection of fused stream operators. In specific example, operator graph 332, 700 could include one or more execution paths between specific stream operators 440, which could include execution paths to different stream operators 440 within the same processing element 154, 435.

EXAMPLE

Figure 8:
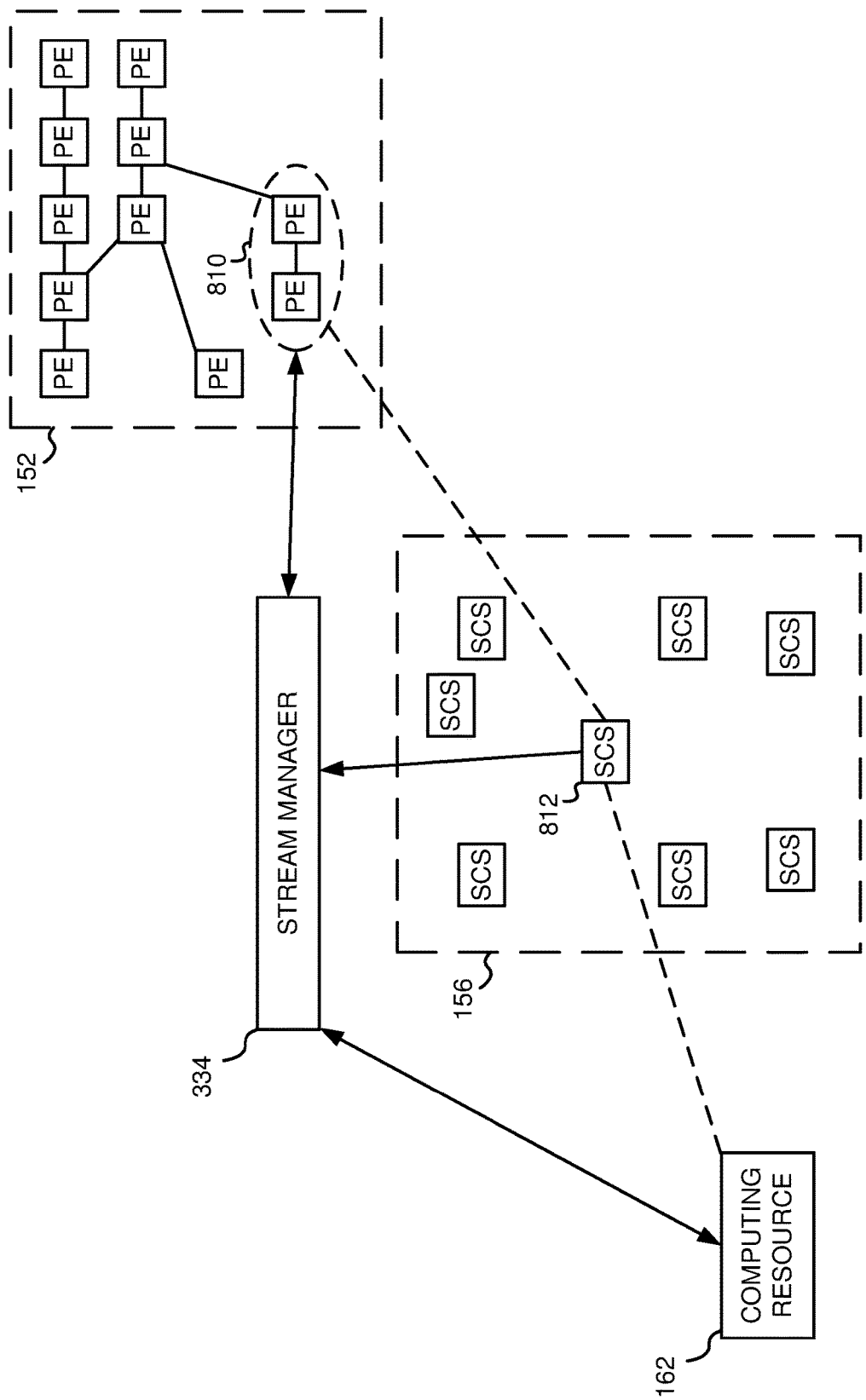
FIG. 8 depicts a block diagram in accordance with an embodiment of the present invention.

FIG. 8 depicts an example of the present invention with stream manager 334 assigning processing elements 810 (e.g., processing element 155) to a stream computing server 812 (SCS 812) (e.g., stream computing server 159) in stream computing system 156 so that processing elements 810 (e.g., processing element 155) could access/make use of computing resource 162 (e.g., a data sink/source). For example, the present invention (e.g., via stream manager 334) could place operators/processing elements (e.g., processing element 155, processing elements 810) onto stream computing servers (e.g., stream computing servers 158, 159, 812) via the following configuration statement: config placement: hostColocation("someHostColocationId") type(with_external_source_time,<database system>,10 nanoseconds). Via such a configuration statement, for example, the present invention could direct stream computing system 156 to place a processing element (e.g., processing element 155, processing elements 810) in a distance that would achieve 10 nanosecond latency to some database designated by the name <database system> (e.g., computing resource 162). In its simplest form, the present invention could require a ping command to the external source (e.g., computing resource 162) to come back within 10 nanosecond between the two systems in order to place operators/processing elements (e.g., processing element 155, processing elements 810) on a particular stream computing server (e.g., stream computing server 159, 812). In another example, the present invention could place processing elements (e.g., processing element 155, processing elements 810) at the "quickest" node in the cluster/network of stream computing servers (e.g., stream computing servers 158), or at the "farthest" node within the cluster/network of stream computing servers (e.g., stream computing servers 158).

Computer System

In an exemplary embodiment, the computer system is a computer system 900 as shown in FIG. 9. Computer system 900 is only one example of a computer system and is not intended to suggest any limitation as to the scope of use or functionality of embodiments of the present invention. Regardless, computer system 900 is capable of being implemented to perform and/or performing any of the functionality/operations of the present invention.

Computer system 900 includes a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 912 may be described in the general context of computer system-executable instructions, such as program modules, being executed by a computer system. Generally, program modules may include routines, programs, objects, components, logic, and/or data structures that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in computer system 900 is shown in the form of a general-purpose computing device. The components of computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 912 typically includes a variety of computer system readable media. Such media may be any available media that is accessible by computer system/server 912, and includes both volatile and non-volatile media, removable and non-removable media.

System memory 928 can include computer system readable media in the form of volatile memory, such as random access memory (RAM) 830 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions/operations of embodiments of the invention.

Program/utility 940, having a set (at least one) of program modules 942, may be stored in memory 928 by way of example, and not limitation. Exemplary program modules 942 may include an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the present invention.

Computer system/server 912 may also communicate with one or more external devices 914 such as a keyboard, a pointing device, a display 924, one or more devices that enable a user to interact with computer system/server 912, and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
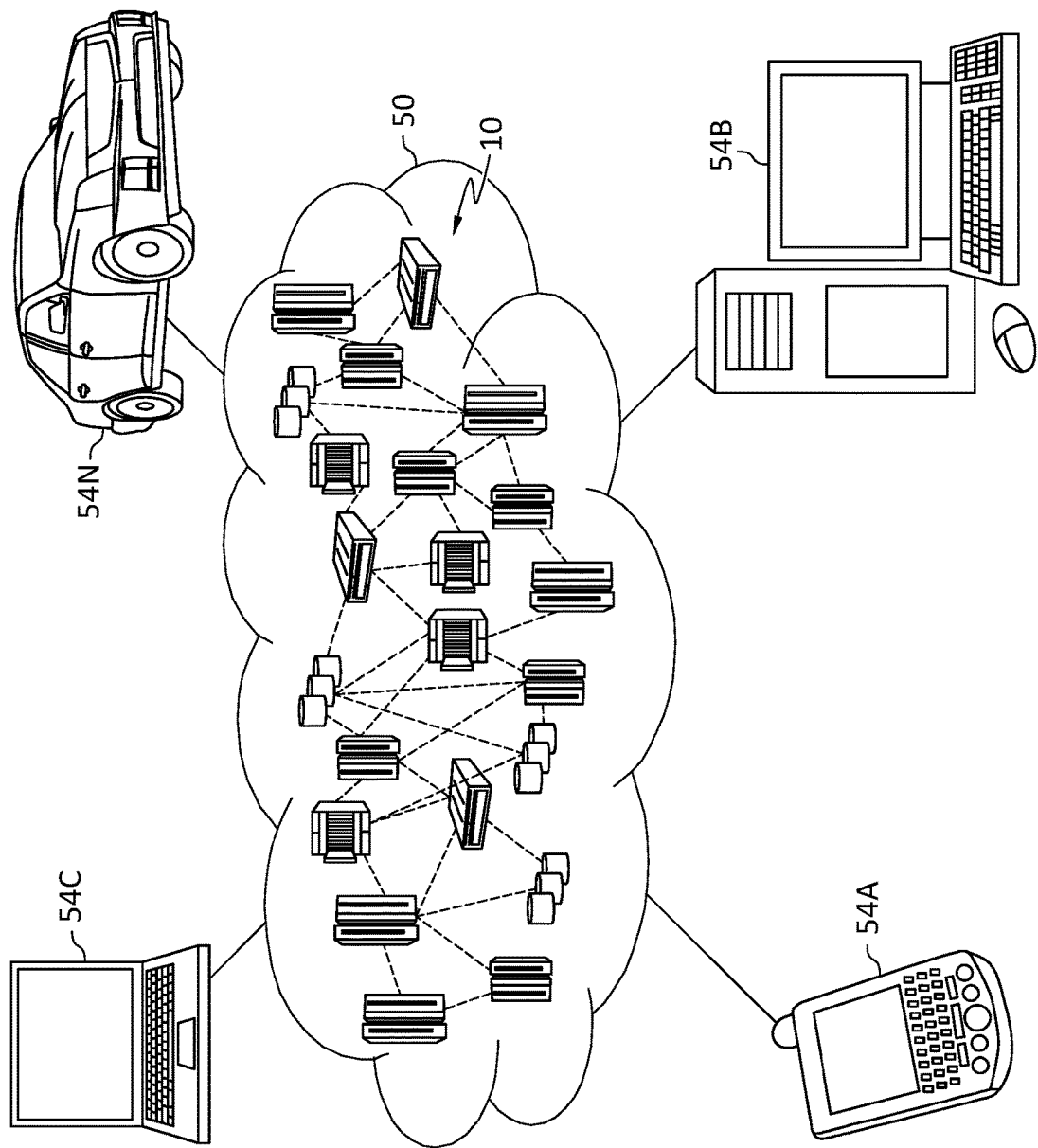
FIG. 10 depicts a cloud computing environment according to various embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
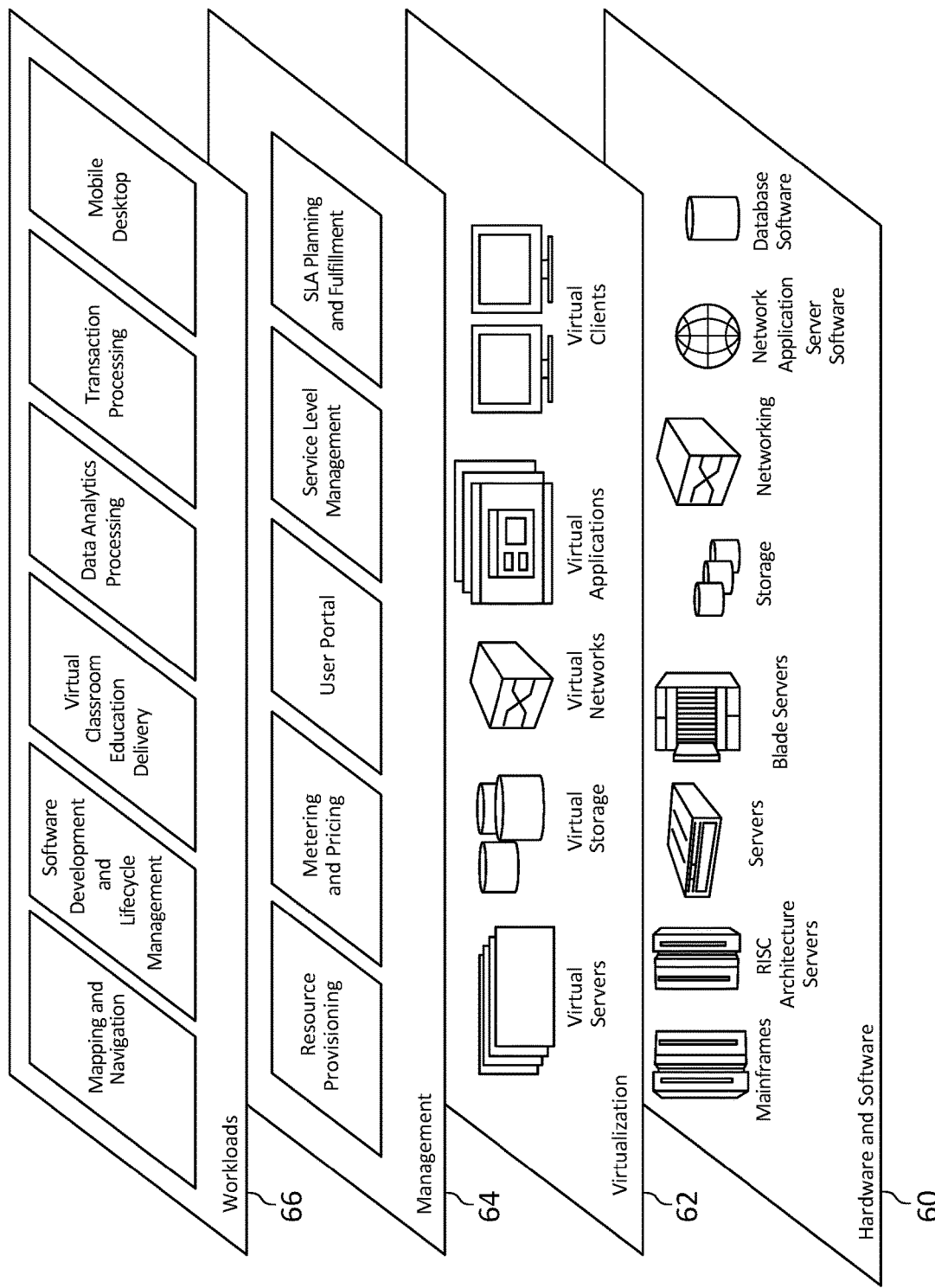
FIG. 11 depicts abstraction model layers according to various embodiments of the present invention.

Referring now to FIG. 11, a set of functional abstraction layers provided by cloud computing environment 50 is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
receiving, by a computer system, performance requirements data of a plurality of processing elements of a computer software application,
wherein the processing elements are configured to execute on a stream computing system,
wherein the stream computing system comprises a network of stream computing servers;
receiving, by the computer system, resource characteristics data of at least one computing resource external to the stream computing system;
receiving, by the computer system, performance characteristics data of the stream computing servers;
calculating, by the computer system and for each of the stream computing servers, at least one communications characteristic value indicating a characteristic of a communication channel between the each of the stream computing servers and the at least one computing resource external to the stream computing system, resulting in communications characteristics values of the stream computing servers; and in response to receiving, by the computer system, a request from at least one processing element among the processing elements to communicate with the at least one computing resource external to the stream computing system, assigning, by the computer system, the at least one processing element to the at least one stream computing server with a communications characteristic value that satisfies requirements indicated by the performance requirements data of the at least one processing element with respect to the resource characteristics data of the at least one computing resource external to the stream computing system and with respect to the performance characteristics data of the stream computing servers, wherein the communications characteristic value indicates a distance between the at least one stream computing server and the at least one computing resource external to the stream computing system.

2. The method of claim 1 wherein the receiving the performance requirements data comprises receiving the performance requirements data at one of a startup time of the computer software application and a runtime of the computer software application.

3. The method of claim 2 wherein the receiving the performance requirements data at the startup time of the computer software application comprises receiving metadata of the processing elements of the computer software application at the startup time of the computer software application.

4. The method of claim 1 wherein the receiving the resource characteristics data comprises receiving the resource characteristics data at one of a startup time of the computer software application and a runtime of the computer software application.

5. The method of claim 1 wherein the receiving the performance characteristics data comprises receiving the performance characteristics data at one of a startup time of the computer software application and a runtime of the computer software application.

6. The method of claim 1 wherein the at least one computing resource external to the stream computing system comprises a computer data source/sink.

7. The method of claim 6 wherein the computer data source/sink is at least one of a computer database, a computer message queue, a computer storage device, a sensor, a camera, and a microphone.

8. The method of claim 1 wherein the at least one communications characteristic value further indicates a latency of the communication channel.

9. A system comprising:
a memory; and
a processor in communication with the memory, the processor configured to perform a method comprising,
receiving performance requirements data of a plurality of processing elements of a computer software application,
wherein the processing elements are configured to execute on a stream computing system,
wherein the stream computing system comprises a network of stream computing servers,
receiving resource characteristics data of at least one computing resource external to the stream computing system,
receiving performance characteristics data of the stream computing servers,
calculating, by the computer system and for each of the stream computing servers, at least one communications characteristic value indicating a characteristic of a communication channel between the each of the stream computing servers and the at least one computing resource external to the stream computing system, resulting in communications characteristics values of the stream computing servers; and in response to receiving a request from at least one processing element among the processing elements to communicate with the at least one computing resource external to the stream computing system, assigning the at least one processing element to the at least one stream computing server with a communications characteristic value that satisfies requirements indicated by the performance requirements data of the at least one processing element with respect to the resource characteristics data of the at least one computing resource external to the stream computing system and with respect to the performance characteristics data of the stream computing servers, wherein the at least one communications characteristic value indicates a distance between the each of the stream computing servers and the at least one computing resource external to the stream computing system.

10. The system of claim 9 wherein the receiving the performance requirements data comprises receiving the performance requirements data at one of a startup time of the computer software application and a runtime of the computer software application.

11. The system of claim 10 wherein the receiving the performance requirements data at the startup time of the computer software application comprises receiving metadata of the processing elements of the computer software application at the startup time of the computer software application.

12. The system of claim 9 wherein the receiving the resource characteristics data comprises receiving the resource characteristics data at one of a startup time of the computer software application and a runtime of the computer software application.

13. The system of claim 9 wherein the receiving the performance characteristics data comprises receiving the performance characteristics data at one of a startup time of the computer software application and a runtime of the computer software application.

14. The system of claim 9 wherein the at least one computing resource external to the stream computing system comprises a computer data source/sink.

15. The system of claim 14 wherein the computer data source/sink is at least one of a computer database, a computer message queue, a computer storage device, a sensor, a camera, and a microphone.

16. A computer program product comprising a computer readable storage medium having program instructions embodied therewith, the program instructions executable by a processor to cause the processor to perform a method comprising:
receiving performance requirements data of a plurality of processing elements of a computer software application,
wherein the processing elements are configured to execute on a stream computing system,
wherein the stream computing system comprises a network of stream computing servers;
receiving resource characteristics data of at least one a computing resource external to the stream computing system;

receiving performance characteristics data of the stream computing servers;

calculating, by the computer system and for each of the stream computing servers, at least one communications characteristic value that indicates, for each particular communications characteristic value, a characteristic of a communication channel between a particular stream computing server of the stream computing servers and the computing resource external to the stream computing system, resulting in communications characteristics values of the stream computing servers;

assigning, in response to receiving a request from a first processing element among the processing elements to communicate with the computing resource external to the stream computing system, the first processing element to a first stream computing server with a first communications characteristic value that satisfies requirements indicated by the performance requirements data of the first processing element with respect to the resource characteristics data of the computing resource external to the stream computing system and with respect to the performance characteristics data of the stream computing servers;

determining that a second processing element does not require communication with the computing resource external to the stream computing system; and assigning, in response to the determining, the second processing element to a second stream computing server without considering a second communications characteristic value, wherein the second communications characteristic value indicates a characteristic of a communication channel between the second stream computing server and the computing resource.

17. The computer program product of claim 16, wherein the first stream computing server and the second stream computing server are the same stream computing server.

18. The computer program product of claim 17, wherein the first communications characteristic value and the second communications characteristic value are the same communications characteristic value.

* * * * *